United States Patent
Mundell et al.

[11] Patent Number: 5,911,477
[45] Date of Patent: Jun. 15, 1999

[54] LUMBAR SUPPORT STRUCTURE FOR AUTOMOTIVE VEHICLE

[75] Inventors: Donald D. Mundell, Carthage; John P. Gowing, Joplin; Harold D. Long, Sarcoxie, all of Mo.

[73] Assignee: L&P Property Management Company, South Gate, Calif.

[21] Appl. No.: 08/864,953

[22] Filed: May 29, 1997

[51] Int. Cl.⁶ ........................................... A47C 7/46
[52] U.S. Cl. ............................................. 297/284.4
[58] Field of Search .................. 297/284.4, 284.1, 297/284.7

[56] References Cited

U.S. PATENT DOCUMENTS

| | | |
|---|---|---|
| 674,199 | 5/1901 | Cuthbert . |
| 4,050,738 | 9/1977 | Griffiths . |
| 4,124,252 | 11/1978 | Safir . |
| 4,159,847 | 7/1979 | Arai . |
| 4,295,681 | 10/1981 | Gregory . |
| 4,316,631 | 2/1982 | Lenz et al. . |
| 4,452,485 | 6/1984 | Schuster . |
| 4,627,661 | 12/1986 | Ronnhult et al. . |
| 5,026,116 | 6/1991 | Dal Monte . |
| 5,197,780 | 3/1993 | Coughlin . |
| 5,217,278 | 6/1993 | Harrison et al. . |
| 5,335,965 | 8/1994 | Sessini ................................ 297/284.4 |
| 5,397,164 | 3/1995 | Schuster et al. . |
| 5,449,219 | 9/1995 | Hay et al. . |
| 5,462,335 | 10/1995 | Seyler . |
| 5,468,048 | 11/1995 | Clemens ............................. 297/284.4 |
| 5,474,358 | 12/1995 | Maeyaert . |
| 5,518,294 | 5/1996 | Ligon, Sr. et al. . |

FOREIGN PATENT DOCUMENTS

| | | | |
|---|---|---|---|
| 4314325 | 11/1994 | Germany | ............................ 297/284.4 |
| 94/07393 | 4/1994 | WIPO | ................................ 297/284.4 |

*Primary Examiner*—Peter R. Brown
*Attorney, Agent, or Firm*—Wood, Herron & Evans, LLP

[57] ABSTRACT

A lumbar support mechanism for incorporating in a seat comprises a pair of opposing triangular brackets each having a base and a peak, wherein the brackets are positioned such that said peaks are facing one another. Elongated flexible border elements have ends pivotally coupled proximate the base of each of said brackets. One of the brackets is movable with respect to the other of the brackets to move said peaks together, and the flexible border elements pivot at their ends and flex outwardly away from the brackets to thereby provide support to the lumbar region of a person in the seat.

14 Claims, 3 Drawing Sheets

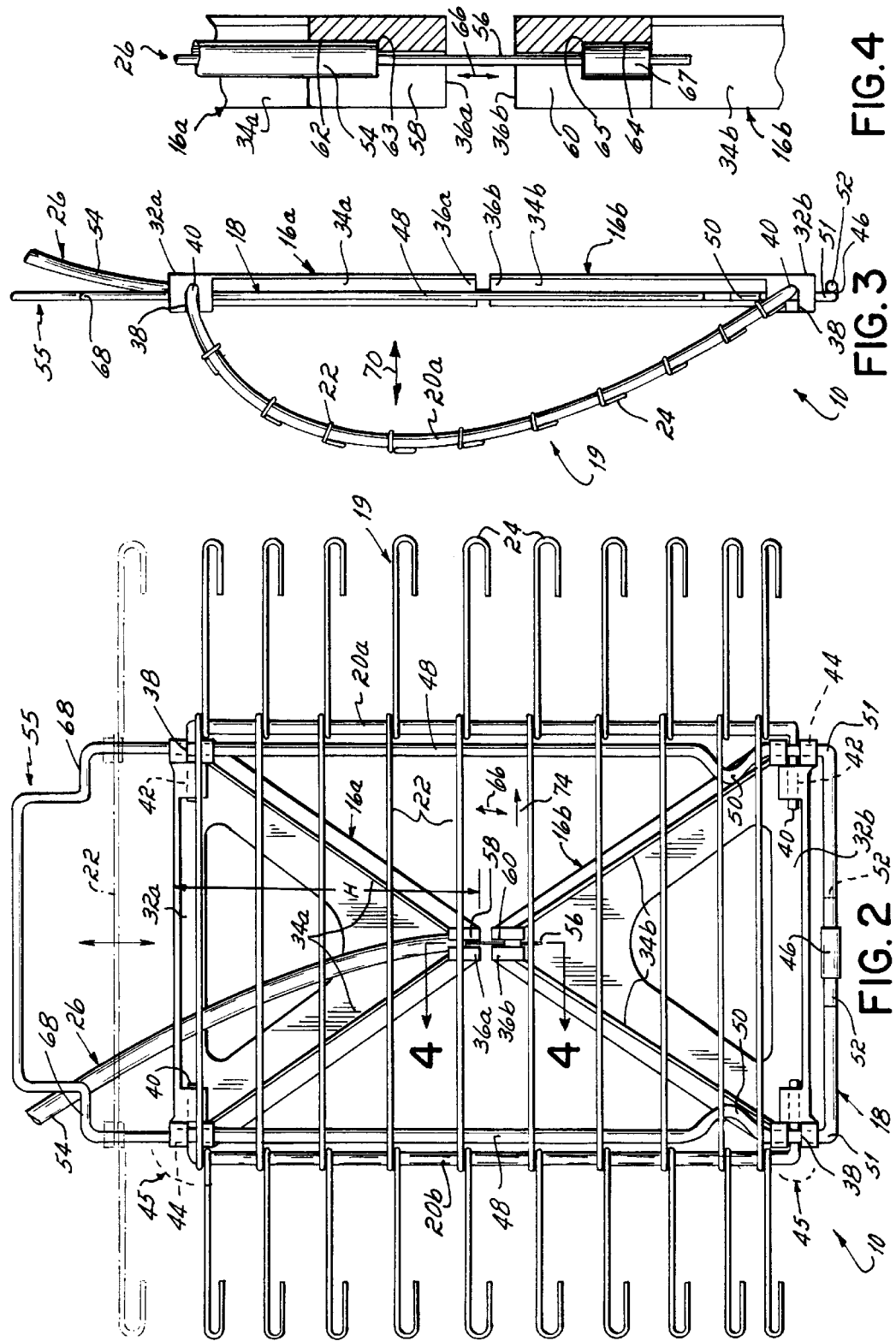

LUMBAR SUPPORT STRUCTURE FOR AUTOMOTIVE VEHICLE

FIELD OF THE INVENTION

The present invention relates generally to lumbar supports for seats and particularly to lumbar supports positioned in the seats of automotive vehicles.

BACKGROUND OF THE INVENTION

In the interest of driver comfort within an automotive vehicle, such as a car, it is generally known to provide support to the lumbar region of the back. Lumbar support structures are placed within the lower region of the seat back proximate to where the lumbar region of the driver's back would be located. Lumbar support structures move an area of the seat back forwardly in a direction generally perpendicular to the planar surface of the seat back and against the lumbar region of the driver to support the lumbar region. By supporting the lower vertebral structures of the lumbar region, lumbar support structures support the lower back and provide comfort for drivers, particularly long distance drivers.

There are currently several lumbar support mechanisms available, as evidenced by various issued patents in the art. While currently available lumbar support structures provide some support to the lumbar region, they often simultaneously cause discomfort to the driver. Particularly, many of the currently available lumbar supports utilize unitary structures, such as paddles which are generally hard and rigid and do not provide the necessary amount of flexibility which is necessary for accommodating the weight of the driver, the shape of the back, and any physical movement or shifting which occurs while driving. Consequently, the driver may have better back support, but will generally experience other discomforts. Therefore, it is desirable to provide a comfortable, conforming lumbar support.

Many such available mechanisms utilize large numbers of complicated machine parts which increase the weight and the overall cost of the structures, as well as their tendency to malfunction. Furthermore, many of the available lumbar support mechanisms are difficult to assemble and position within the seat back of a vehicle. The assembly and installation essentially increases the overall cost of utilizing such lumbar support mechanisms in an automobile.

Still further, available lumbar support mechanisms are difficult to adjust, even though they utilize complex mechanical structures for providing such adjustment. As may be appreciated, when a substantial amount of force is necessary for providing the desired adjustment, it will often be difficult, if not impossible, for a person to make such adjustments when they are driving.

Another significant drawback to existing lumbar support mechanisms is the problem of "roll off". Roll off is generally defined in the industry as the increased load in one side of the lumbar mechanism as a seat occupant rotates their torso to one side of the seat or the other. Such roll off is usually not handled very well by the lumbar support mechanism. For example, some lumbar support mechanisms may be permanently skewed with a shifting of their symmetry, because of such roll off. As a result, the lumbar support mechanisms will not provide the uniform, symmetrical support desired. Also, as the result of such roll off, there may be a tendency for the lumbar support mechanism to bind in some way so that it does not return to its proper form when the roll off forces are removed.

Because lumbar support mechanisms utilize a variety of different moving parts as the lumbar support is adjusted, and also when it is loaded, there is a tendency for such moving parts to be noisy. As will be readily understood, a noisy or squeaky seat is undesirable, and is particularly undesirable from the standpoint of an automobile manufacturer whose finished product will appear to be improperly assembled or made of inadequate materials.

Accordingly, it is an objective of the present invention to provide a lumbar support mechanism which is lightweight and inexpensive, yet provides suitable comfortable support to a driver.

It is a further objective of the present invention to provide a lumbar support mechanism which may be readily assembled with a minimum number of parts.

It is a further objective of the present invention to prevent the effects of roll off by resisting such roll off and maintaining symmetrical, conformal support of the lumbar region of the driver.

It is still another embodiment of the invention to provide a quiet and easily adjusted lumbar mechanism which may be interfaced readily with an actuator mechanism without affecting the ultimate seat structure in which the lumbar mechanism is inserted.

These and other objectives will become more readily apparent from the description of the invention set forth herein below.

SUMMARY OF THE INVENTION

The lumbar support mechanism of the present invention is comprised of a pair of opposing triangularly shaped or triangular brackets which each have a base, side elements or sides and a peak. The brackets are positioned in the lumbar support mechanism such that the peaks are facing one another. The bases of the opposing brackets are proximate the top and bottom of the lumbar grid. Two elongated flexible border elements or wires, have ends which are pivotally coupled into appropriately formed slots and apertures in the base of the triangularly shaped brackets. A base wire structure also extends through appropriately formed openings in the bases of the brackets and couples the brackets together. One of the brackets is fixedly coupled by the base wire structure while the other bracket is moveably coupled to the base wire structure and is able to move vertically up and down on the base wire structure.

The border elements extend generally parallel to each other and are positioned on either side of the lumbar support mechanism with the ends pivoting proximate the base corners of the brackets. Transverse wire elements extend between the border elements and thus create the lumbar support grid. One of the brackets is movable with respect to the other bracket on the base wire structure. The brackets are coupled together at their peaks, preferably by a bowden cable assembly, and when the cable is drawn through the sheath of the assembly, the peaks are drawn or moved together. Moving the peaks and brackets together shortens the length between the respective bases and accordingly shortens the effective vertical length of the border wires to flex the elongated border wires which are pivotally coupled to the base of each bracket. The ends of the border wires pivot with respect to the brackets when they are flexed. The flexed border wires create a bowed lumbar grid which provides support.

A bowden cable assembly is preferably used as an actuator to draw the peaks of the brackets together for flexing or bowing the lumbar grid. The cable is attached to one peak and the sleeve is attached to the other peak. Preferably, an aperture is formed in the base of the triangularly shaped brackets for directing the bound cable assembly to the bracket peaks within the plane of the lumbar grid to prevent portions of the cable from being visible in a seat back containing the invention.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 2 is a front view of the lumbar support mechanism of the invention;

FIG. 3 is a side view of the lumbar support mechanism of the present invention, shown in a bowed state;

FIG. 4 is a cross-sectional view along lines 4—4 of FIG. 2, illustrating the operable coupling between elements of the invention;

DETAILED DESCRIPTION OF THE INVENTION

Figure 1:
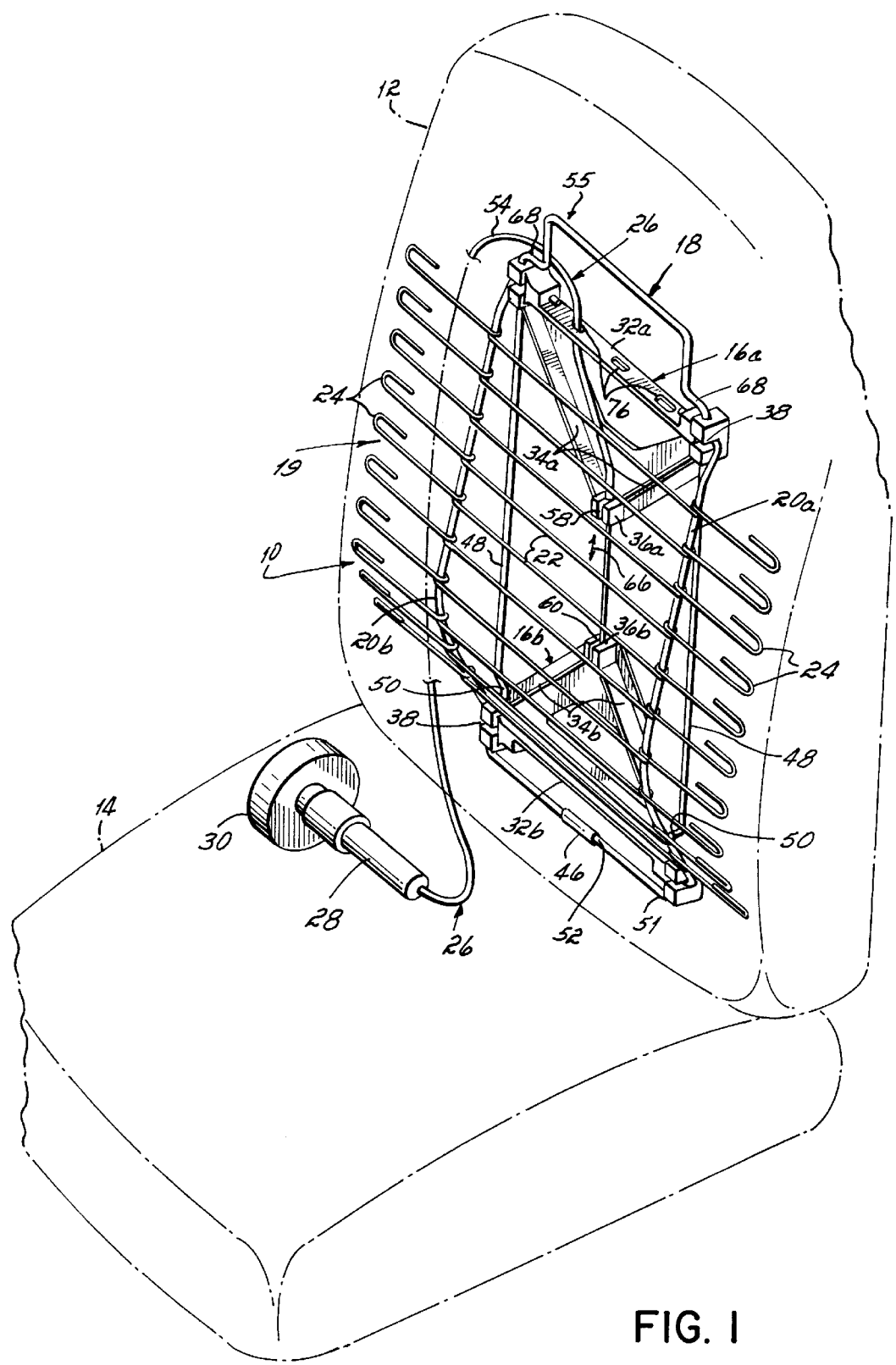
FIG. 1 is a perspective view of the present invention incorporated into an automotive vehicle seat.

FIG. 1 is a perspective view of the lumbar support mechanism 10 of the invention, shown incorporated into the seat back 12 of an automotive seat. A person, such as a driver, sitting on the bottom 14 of the seat will be provided lumbar support by mechanism 10 when it is bowed or flexed. Mechanism 10 is shown as being visible in FIG. 1, for illustrative purposes only. As is conventional in the art, the lumbar support mechanism will generally be covered by the fabric and batting material of seat back 12, and thus will not be visible to the seat's occupant, but still be left in the lumbar region.

Mechanism 10 includes a pair of opposing triangular or triangularly-shaped brackets 16a, 16b which are formed of a rigid material, such as plastic or some other suitable lightweight, durable, and rigid material.

Brackets 16a, 16b are coupled together by a base wire structure 18 which preferably engages both of the brackets 16a and 16b to hold them in a suitable spatial relationship and to further provide a base for the lumbar support mechanism 10. Border elements 20a and 20b are also coupled to the triangular brackets 16a and 16b for providing the border for a support grid 19 of the lumbar support mechanism. The support grid 19 further comprises transverse wire members 22 which extend generally perpendicular to the border elements 20a, 20b and therebetween to further complete the support grid for the lumbar support mechanism 10. The transverse wire elements 22 are generally wrapped around the border elements 20 for securement as illustrated in the figures. The ends 24 of the transverse wire elements 22 are then bent 180° to provide smooth ends which will not snag or otherwise puncture the material and batting of the seat back 12. In an alternative embodiment, the transverse wire elements 22 may stop at the border elements 20 instead of continuing out to the ends 24. The lumbar support mechanism 10 is actuated preferably by a bowden cable assembly 26 which draws the triangular brackets 16a, 16b together to bow the border elements 20a, 20b and thus bow the entire lumbar support grid 19. The bowden cable assembly 26 is coupled to an actuator mechanism 28 which pulls a wire within the sheath of the bowden cable assembly 26 as discussed further hereinbelow. Actuator 28, in turn, is coupled to a knob or handle 30 for operating the actuator 28 and bowing or relaxing support grid 19 to adjust the grid support.

Figure 5:
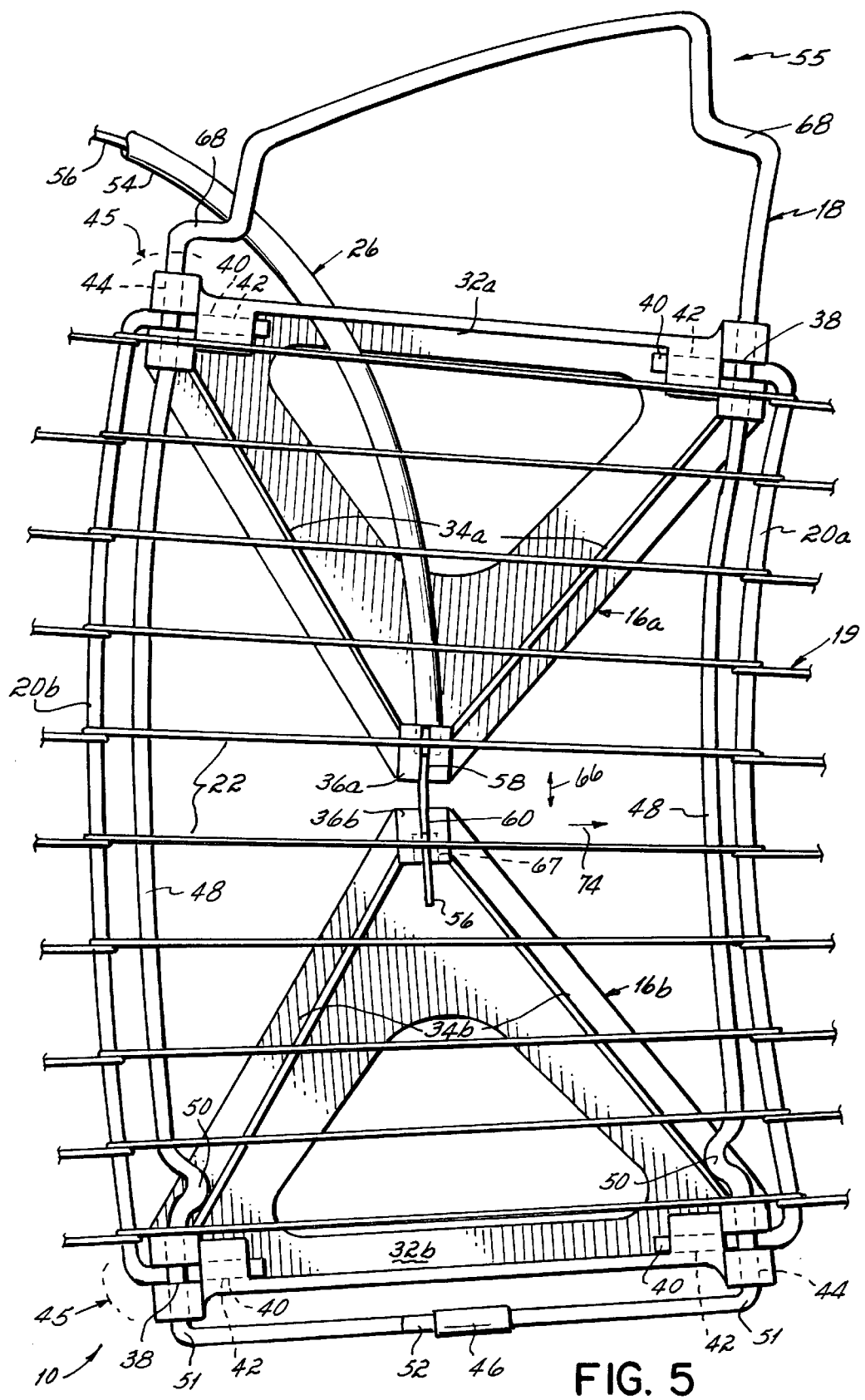
FIG. 5 is a front view of the lumbar support mechanism of the invention shown in a skewed position by a weight load.

Referring to FIG. 2, the triangular brackets 16a, 16b essentially each have a base 32a, 32b, two rigid side elements or sides 34a, 34b, and peaks 36a, 36b. When assembled within the lumbar support mechanism 10 of the invention, triangular brackets 16a, 16b are opposing each other and are placed so that their bases 32a, 32b are on opposite ends of the mechanism 10 while their peaks 36a, 36b are generally adjacent or face each other for interaction with the bowden cable assembly 26, as discussed further herein below. That is, one triangular bracket 16a points downwardly and another triangular bracket 16b points upwardly. In assembling the lumbar support system 10, the border elements are attached into pivot slots 38 formed at either end of the base of the triangular brackets (see FIGS. 1 and 3). The border elements 20a, 20b which are preferably border wires, are bent at preferably 90° at approximately 1.25 inches from their ends to form pivot legs 40. The pivot legs 40 fit into the pivot slots 38 to provide the pivot points for the border elements when the lumbar grid is bowed, as illustrated in FIGS. 2 and 3. That is, the pivot legs 40 rotate within the pivot apertures 42 of the triangular brackets without binding to provide smooth, quiet and easy bowing and relaxing of the lumbar support mechanism 10. Referring to FIG. 5, the pivot slots are juxtaposed pivot openings or apertures 42 which are formed in the ends of the base of the triangular brackets 16a, 16b (i.e., the base corners of the triangular bracket) and extend generally parallel to the base. When lumbar grid 19 of the invention is assembled, the brackets 16a, 16b can be rotated to an angle to allow the border wires 20a, 20b to slide into the pivot slots 38. Next, insertion of the opposite border wire may be accomplished. The brackets are then positioned so that the peaks 36a, 36b are adjacent each other within the grid 19. The brackets will be centered in the grid, with the peaks proximate the longitudinal and transverse middle of grid 19.

To secure the border wires 20a, 20b in the brackets 16a, 16b, the base wire structure 18 is inserted into openings or apertures 44 formed in the base corners of the triangular bracket, and extending generally perpendicular to slots 38 and openings 42. The base wire structure 18 fits first through the openings 44 of the upper triangular bracket 16a and then through the openings in bracket 16b (see FIG. 5). Preferably, the base wire structure 18 is a single wire structure which is overlapped and clipped at its ends 52 such as by a clip 46 proximate the overall base of the lumbar grid 19. In that way, side elements 48 of the base wire structure 18 extend generally parallel to the border wires 20a, 20b as illustrated in FIGS. 2 and 5. Insertion of the base wire structure locks the border wires 20a, 20b into the brackets 16a, 16b. Dimples 50 are formed in the base wire structure proximate the base 32b of triangular bracket 16b for maintaining bracket 16b generally stationary or fixedly coupled with respect to the lumbar grid 19.

Referring to FIG. 2, the combination of the dimples 50 and the bends 51 made in the border wire structure 18 prior to the overlapped ends 52 and clip 46 will generally secure the bracket 16b at the base of the lumbar grid 19. Bracket 16a is not secured in such a way, and therefore bracket 16a is moveably coupled to base wire structure 18 to slide up and down on the vertical border wire sections 48 to provide for bowing, relaxing, and flexing of the lumbar grid 19 under load. The upper section 55 of the base wire structure is appropriately formed for attaching the lumbar support mechanism 10 of the invention to a seat frame, as illustrated in FIG. 1. Section 55 may be lengthened and dimensioned to enable the mounting of the mechanism 10 with any seat frame back.

Preferably, the base wire structure is around 11 gauge and is coated with plastic, such as polyethylene, for a quiet and durable surface on which the brackets, and particularly bracket 16a, may move. Furthermore, plastic coated base wire structure 18 provides a noiseless and easy way of attachment of the lumbar support mechanism to a seat frame. In accordance with the principles of the present invention, mechanism 10 may be assembled without the use of a large number of mechanical securement structures such as rivets, screws, or clips. Generally the only clip required is 46, for clipping the overlapped ends 52 of the base wire structure 18 together. The lumbar grid thus formed is lightweight and relatively inexpensive to assemble and manufacture.

As mentioned above, lumbar support mechanism 10 is actuated by a bowden cable assembly 26, which includes a sleeve 54 and a cable 56. The bowden cable assembly 26 is anchored to the triangular brackets 16a, 16b with the sleeve anchored to one bracket 16a and the cable anchored to another bracket 16b. Referring to FIG. 4, a cross-section of the juxtaposed or adjacent peaks 36a, 36b of the brackets is illustrated. At peak 36a of bracket 16a, the cable extends through a slot or aperture 58 which is generally aligned with a slot or aperture 60 in peak 36b when the lumbar grid 19 is assembled. Slot or aperture 58 includes a larger diameter portion 62 which forms a shoulder 63. Generally, the brackets 16a and 16b will be similarly fabricated so that they will be interchangeable within the lumbar support grid 19 of the invention. Accordingly, slot or aperture 60 also includes a larger diameter portion 64 with a shoulder 65. Within bracket 16a, the end of the sleeve 54 engages the shoulder 63 so that sleeve 54 is secured within bracket 16a and prevented from moving in the vertical direction 66 with respect to bracket 16a. At the end of cable 56, a barrel or other suitably shaped stop structure 67, is fixed for engaging shoulder 65. Therefore, the end of cable 56 is fixed with respect to bracket 16b. As illustrated in FIG. 1, the actuator mechanism 28 is operable for pulling cable 56 within sheath 54 to bow the lumbar grid 19 or may relax the cable within the sheath for relaxing the grid. Actuator 28 may be any suitable actuator which is capable of pulling or drawing cable 56 in response to movement, such as rotation, of an operating device, such as knob or handle 30. For example, knob or handle 30 might be turned clockwise or counter clockwise to move cable 56. Generally, the actuator mechanism 28 will be readily accessible to the driver for adjusting the lumbar support mechanism.

FIG. 1 shows the lumbar support grid 19 generally in a relaxed state wherein the triangular brackets 16a, 16b are juxtaposed and the upper triangular bracket 16a is at its farthest position with respect to the bracket 16b. Referring to FIG. 2, the position of the upper transverse wire element 22 is shown in phantom to illustrate the upper movement of bracket 16a.

When the lumbar grid is bowed as illustrated in FIG. 2 and 3, the upper bracket 16a moves toward the lower bracket 16b and the uppermost transverse wire element 22 is lowered accordingly. Generally, the base of the lumbar support mechanism 10, which is defined by the bottommost sections of the base wire structure 18 in the base 32b of triangular bracket 16b, will be fixed within the seating structure which is attached to a frame or other rigid structure (not shown) in the seat back 12 (see FIG. 1). As discussed above, bracket 16b is fixed in position with respect to the lumbar grid as defined by the base wire structure 18. Dimples 50 maintain bracket 16b in a generally stationary position although some movement may occur.

However, bracket 16a is moveably coupled and is free to slide up and down on the base wire structure 18 and is limited in its upper movement only by bends 68 formed in the upper part of the base wire structure 18.

FIGS. 2 and 3 illustrate the lumbar section as it is bowed to provide lumbar support to a person sitting on the seat illustrated in FIG. 1. When the lumbar section is bowed, it projects generally outwardly away from base wire 18 as illustrated by reference numeral 70. More specifically, actuator 28 is used to draw cable 56 through the sleeve 54 of the bowden cable assembly 26. In doing so, the end of cable 56 containing the stop structure 67 is drawn toward the end of sleeve 54 at shoulder 63. Stop structure acts on shoulder 65 and sleeve 54 acts on shoulder 63 to draw or otherwise move the peaks 36a, 36b of the brackets together and thus move the brackets themselves together. In doing so, the distance between the bases 32a, 32b of respective brackets is shortened. Bracket 16a moves while bracket 16b is generally stationary.

Reacting to the respective movement of bracket 16a and the shortened distance between the bases of the brackets, the border wires 20a, 20b must shorten their length and thus bow outwardly as shown in FIG. 3 to bow the entire lumbar grid 19. When actuator 28 is utilized to move the cable 56 the opposite direction within sleeve 54, bracket 16a will move vertically upwardly away from bracket 16b so that the peaks are moved apart and the border wires 20a, 20b will lengthen to relax or unbow the grid 19. Preferably, cable 56 may be drawn or moved in a continuous fashion to provide for generally an infinite adjustment of lumbar grid 19. The shape and relative convexity of the lumbar grid 19 will be defined by the height H of the triangular brackets, and the position of the bend structure 68 of base wire structure 18 and the distance between the peaks when separated. As illustrated in FIG. 2, bracket 16a will stop its vertically downward movement only when peak 36a contacts 36b. When the lumbar grid 19 is bowed as shown in FIG. 3, the tension on the brackets formed on the bowed border wires 20a, 20b biases the brackets away from each other so that adjustment to the relaxed position is made very easily. Grid 19 thus provides comfortable lumbar support with transverse wire elements 22 which flex and conform along with border wires 20 to fit against the lumbar region of a seated person.

The lumbar support mechanism 10 of the invention is lightweight and inexpensive to manufacture and assemble. Assembly may be completed without a large number of different fastening structures such as clips, rivets or screws. Generally, the only clip 46 will be utilized to attach the overlap ends 52 of the base wire structure 18. The pivot feet 40 of the border wires 20a, 20b are held in place by base wire structure 18. The relatively few number of parts also makes assembly very easy and quick; thus, reducing manufacturing costs. Furthermore, the plastic coated wire reduces noises, from the lumbar support mechanism, when it is bowed and relaxed and also when it is loaded by weight such as when a person sits in the seat containing the lumbar mechanism.

In accordance with another principle of the present invention, the inventive lumbar support mechanism 10 prevents roll-off when one side of the lumbar grid is loaded to a greater extent than the other side. As mentioned above, when a seat occupant rotates their torso to one side of the seat or lumbar grid, one border of the lumbar grid has to resist a greater load. Oftentimes, the lumbar grid is not able to withstand the load, and essentially will not provide the support necessary. Furthermore, the lumbar grid may be permanently bent or misshapened by the roll off preventing it from returning to its proper rest or relaxed position. Also, roll off may cause binding of some of the moving elements. To resist such roll off effects, the lumbar support mechanism 10 of the invention provides for attachment of the cable mechanism to tensioning mechanism generally forward of the pivot points of the lumbar grid 19 which are defined by the base corners of each triangular bracket 16a and 16b and the pivoting of feet 40 within slots 38 and aperture 42. By providing a tension force at the peaks 36a, 36b of the triangular brackets as the brackets are held together, a moment arm is created along the sides or side elements 34a, 34b of the triangular brackets which provides a force at the base corners of the triangle approximate the pivoting points for feet 40 of the border wires. In that way, the moment arm forces the triangular brackets to return to their proper centered and symmetrical positions as shown in FIG. 2.

Referring to FIG. 5 for illustrative purposes, when the seat occupant rotates the torso to the left side (facing FIG. 5) of the lumbar grid 19, border wire 20b will receive the predominant portion of the load on the grid 19 and thus will be indented more than border wire 20a. In effect, wire 20b will be lengthened and wire 20a will be shortened. Therefore, the grid 19 will be skewed as illustrated in FIG. 5 and the lumbar support provided by grid 19 will be inconsistent across the grid. The skew in FIG. 5 is exaggerated for illustrative purposes, and generally the base of the lumbar grid will be secured to a seat frame structure and therefore will remain generally horizontal with the base of bracket of 16b while bracket 16a will be skewed.

The peaks 36a, 36b will generally be drawn toward border wire 20b due to the relative lengthening of border wire 20b with respect to border wire 20a. The tension at the peaks of the brackets provided by the bowden cable assembly 26 will provide a force on the brackets in the direction illustrated by reference numeral 74, which will counteract the force provided by the elongated border wire 20b. The force applied at the peaks 36a, 36b is translated along the side elements 34a, 34b to the pivot areas or points 45 at the base corners of the triangular brackets proximate pivot feet 40. The force will tend to want to shorten border wire 20b and lengthen border wire 20a so that the lumbar grid returns to a symmetrical position as illustrated in FIG. 2. Accordingly, the invention helps to prevent roll off by resisting or counteracting the affects of the roll off and provides more consistent lumbar support. Furthermore, the invention prevents permanent damage to the lumbar structure, such as by bending or misshaping of the elements which experience the roll off forces. Still further, the force provided from the peaks and translated along the side elements prevents binding of the brackets on base wire structure 18.

Routing of bound control cables and lumbar support mechanisms often creates problems because any kinks in the cable assembly creates increased friction for the actuator resulting in greater effort by a driver on trying to operate the actuator mechanism. To that end, the invention further comprises guide apertures 76 which are formed in the bases 32a, 32b of the triangular brackets. Referring to FIG. 1, cable assembly 26 is threaded through one of the appropriate apertures 76 to provide for attachment of the sleeve 54 and cable 56 to the appropriate peaks of the triangular bracket. Preferably, a number of guide apertures are spaced along the base of the triangular brackets for proper positioning of cable assembly 26 without kinks or other sharp bends.

Furthermore, threading of the bowed cable assembly 26 through the base of the triangular brackets and terminating the cable assembly at the peaks of the brackets eliminates the cable from sticking too far out of the plane of the brackets and grid 19 and thus causing the cable to be visible through the seat fabric and batting covering the seat back 12.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A lumbar support mechanism for incorporating in a seat comprising:

a pair of opposing brackets each having a base and an angled peak spaced from the base, the brackets coupled to a base structure and positioned such that said peaks are facing one another;

an elongated flexible border element coupled between the brackets and having ends pivotally coupled to the brackets proximate the base of each of said brackets;

one of said brackets being movable with respect to the base structure and with respect to the other of said brackets for moving said peaks together;

said flexible border element operable for pivoting at its ends and flexing outwardly away from said brackets when said peaks are moved together;

to thereby provide support to the lumbar region of a person in the seat.

2. The lumbar support mechanism of claim 1 wherein said brackets are generally triangular in shape having at least one elongated side extending from the base to said angled peak.

3. The lumbar support mechanism of claim 1 further comprising an actuator, said actuator coupled to said brackets proximate said peaks and operable for moving said peaks together.

4. The lumbar support mechanism of claim 3 wherein said actuator is a bowden cable assembly.

5. The lumbar support mechanism of claim 4 wherein said bowden cable assembly includes a sleeve and a cable movable within the sleeve, the sleeve being coupled to one of said brackets and the cable being coupled to the other of said brackets.

6. The lumbar support mechanism of claim 1 further comprising another elongated flexible border element coupled between the brackets and spaced from the other border element, the another border element having ends pivotally coupled proximate the bracket bases, the border elements flexing outwardly together to form a support grid.

7. The lumbar support mechanism of claim 6 further comprising transverse elements extending between said flexible border elements for further providing support.

8. The lumbar support mechanism of claim 1 further comprising transverse elements coupled to said border element and extending therefrom for further providing support.

9. The lumbar support mechanism of claim 1 wherein said base structure comprises a base wire extending through portions of said brackets for coupling said brackets thereto.

10. The lumbar support mechanism of claim 9 wherein each of said brackets includes a slot proximate said base for receiving an end of said flexible border element and an aperture directed generally across said slot, the base wire extending through said aperture and securing said border element end.

11. The lumbar support mechanism of claims 9 wherein said base wire includes a plastic coating.

12. The lumbar support mechanism of claim 1 wherein one of said brackets is slideable on said base structure for moving said peaks together.

13. The lumbar support mechanism of claim 1 wherein said peak of one of said brackets is spaced from said base and is coupled to the base by a rigid side element, the side element operable for translating a force on said peak to said base for providing even support to a lumbar region.

14. The lumbar support mechanism of claim 1 wherein one of said brackets is fixedly coupled to said base structure and the other of said brackets is movably coupled to said base structure.

* * * * *